(12) United States Patent
Davis

(10) Patent No.: US 8,919,867 B2
(45) Date of Patent: Dec. 30, 2014

(54) FRONT PILLAR GARNISH

(71) Applicant: Honda Motor Co., Ltd., Tokyo (JP)

(72) Inventor: Corey Davis, Hoover, AL (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 13/827,961

(22) Filed: Mar. 14, 2013

(65) Prior Publication Data

US 2014/0265449 A1  Sep. 18, 2014

(51) Int. Cl.
*B62D 25/04* (2006.01)
*B62D 65/14* (2006.01)

(52) U.S. Cl.
CPC ............... *B62D 25/04* (2013.01); *B62D 65/14* (2013.01)
USPC .................................................... 296/193.06

(58) Field of Classification Search
USPC ............................ 296/193.06, 1.08, 191, 39.1
See application file for complete search history.

(56) References Cited

U.S. PATENT DOCUMENTS

| | | | | |
|---|---|---|---|---|
| 5,580,116 A | * | 12/1996 | Patel et al. | 296/39.1 |
| 5,791,716 A | * | 8/1998 | Takagi et al. | 296/39.1 |
| 6,672,027 B2 | | 1/2004 | Mizutani et al. | |
| 6,848,711 B2 | * | 2/2005 | Yamamura et al. | 280/730.2 |
| 7,172,209 B2 | * | 2/2007 | Totani et al. | 280/728.2 |
| 7,404,576 B2 | * | 7/2008 | Lizak | 280/743.2 |
| 7,607,684 B2 | * | 10/2009 | Downey et al. | 280/730.2 |
| 7,611,162 B2 | | 11/2009 | Kim | |
| 7,621,556 B2 | | 11/2009 | Itakura | |
| 7,703,798 B2 | * | 4/2010 | Yamagiwa et al. | 280/728.2 |
| 7,810,838 B2 | * | 10/2010 | Iwayama et al. | 280/730.2 |
| 8,297,676 B2 | * | 10/2012 | Osterhout et al. | 296/1.08 |
| 8,328,259 B2 | * | 12/2012 | Matsuzaki et al. | 296/1.08 |
| 2005/0052001 A1 | * | 3/2005 | Totani et al. | 280/728.2 |
| 2005/0087961 A1 | * | 4/2005 | Lee | 280/728.2 |
| 2007/0108742 A1 | * | 5/2007 | Itakura | 280/728.3 |
| 2012/0104784 A1 | | 5/2012 | Sapak et al. | |
| 2012/0119531 A1 | | 5/2012 | Osterhout et al. | |
| 2012/0119532 A1 | | 5/2012 | She | |
| 2012/0161460 A1 | | 6/2012 | Nakazawa et al. | |

* cited by examiner

*Primary Examiner* — H Gutman
(74) *Attorney, Agent, or Firm* — Rankin, Hill & Clark LLP

(57) ABSTRACT

A vehicle assembly includes a vehicle body including a structural pillar. A headliner at least partially covers an exposed interior surface of the pillar. An interior garnish is secured to the headliner and is configured to conceal a lower edge portion of the headliner and cover at least a portion of the pillar. The interior garnish includes a main body having a pillar facing surface, a passenger compartment facing surface, a first longitudinal side portion, an opposite second longitudinal side portion, and an upper end portion. The interior garnish further includes a first engagement member located adjacent the first side portion and a second engagement member located adjacent the second side portion. The first engagement member is configured to hold the interior garnish in an install position relative to the headliner, and the second engagement member is configured to secure the interior garnish to the headliner.

19 Claims, 7 Drawing Sheets

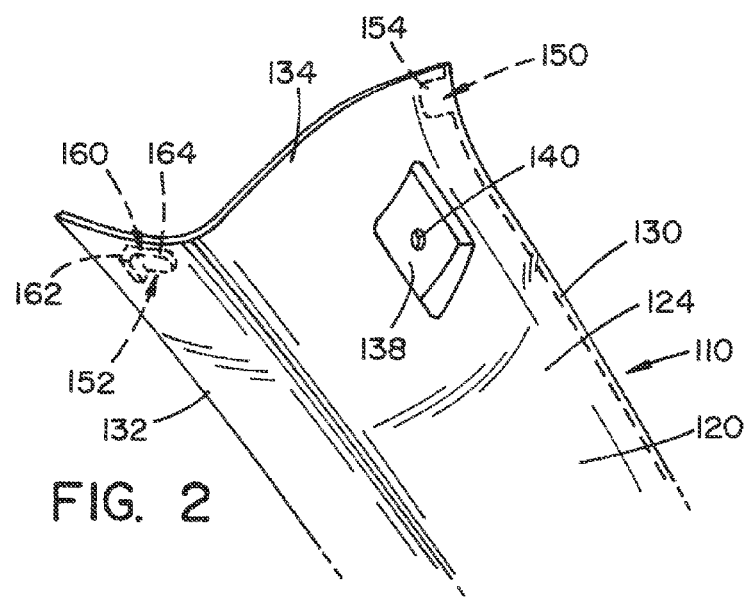
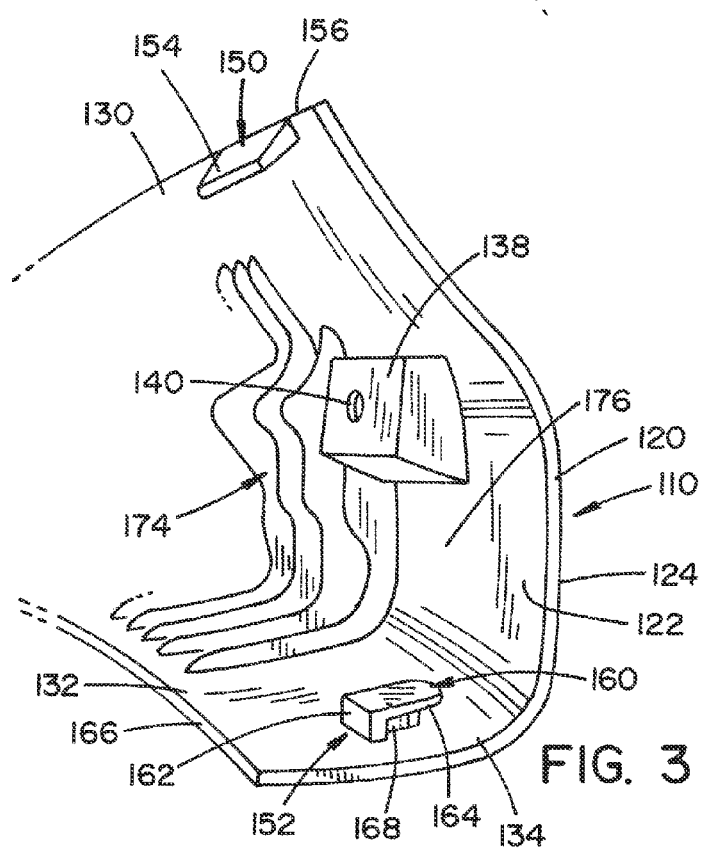

US 8,919,867 B2

FRONT PILLAR GARNISH

BACKGROUND

The interior of the vehicle typically includes various interior trim panels and/or garnishes that cover the vehicle body as well as other vehicle components disposed inside of the passenger cabin. These interior trim panels are often provided over the metal structural elements of the vehicle body, such as the A, B, C and/or D pillars, to provide an attractive appearance. These interior trim panels sometimes include, for example, tabs that engage openings in other components, such as a headliner, to aid in securing the trim panel in a correct orientation over the vehicle body and/or the vehicle components disposed inside of the passenger cabin. One problem with known interior trim panels is the formation of gaps between the trim panel and the component. For example, it is known for a gap to form between a headliner and a front pillar garnish which is visible to the occupant. This visible gap at the intersection of the garnish and component can affect the aesthetics of the vehicle interior and can provide a feeling of inferior quality to the occupant of the vehicle.

BRIEF DESCRIPTION

In accordance with one aspect, a vehicle assembly comprises a vehicle body including a structural pillar. A headliner at least partially covers an exposed interior surface of the pillar. An interior garnish is secured to the headliner and is configured to conceal a lower edge portion of the headliner and to cover at least a portion of the pillar. The interior garnish includes a main body having a pillar facing surface, a passenger compartment facing surface, a first longitudinal side portion, an opposite second longitudinal side portion, and an upper end portion. The interior garnish further includes a first engagement member located adjacent the first side portion and a second engagement member located adjacent the second side portion. The first engagement member is configured to hold the interior garnish in an install position relative to the headliner, and the second engagement member is configured to secure the interior garnish to the headliner.

In accordance with another aspect, a vehicle assembly comprises a vehicle body including an A-pillar. A headliner at least partially covers an interior surface of the A-pillar. A front pillar garnish is secured to the headliner and conceals a lower edge portion of the headliner and covers at least a portion of the A-pillar. The front pillar garnish includes a main body including a pillar facing surface having a lock tab and a restraining tab. The lock tab engages the headliner and presses the headliner towards the pillar facing surface of the front pillar garnish main body. The restraining tab creates an opposing force to hold the front pillar garnish in an install position. The lock tab and the restraining tab pull the headliner and front pillar garnish together.

In accordance with yet another aspect, a method of assembling a front pillar garnish to an A-pillar of a vehicle body comprises providing a first engagement member and a second engagement member on a pillar facing surface of a main body of the front pillar garnish; positioning the first engagement member behind an edge portion of the headliner and engaging the edge portion with the first engagement member, the first engagement member creating an opposing force to hold the front pillar garnish in an install position; positioning the second engagement member in an opening located in the headliner; weaving an upper end portion of the main body with a section of the headliner to create a material overlap; and concealing the material overlap with a door open seal.

BRIEF DESCRIPTION OF THE DRAWINGS

FIG. 2 is a perspective view of a passenger compartment facing surface of the interior garnish or trim of FIG. 1.

FIG. 3 is a perspective view of a pillar facing surface of the interior garnish or trim of FIG. 1.

DETAILED DESCRIPTION

It should, of course, be understood that the description and drawings herein are merely illustrative and that various modifications and changes can be made in the structures disclosed without departing from the present disclosure. In general, the figures of the exemplary front pillar garnish are not to scale. It will also be appreciated that the various identified components of the exemplary front pillar garnish disclosed herein are merely terms of art that may vary from one manufacturer to another and should not be deemed to limit the present disclosure.

Figure 1:
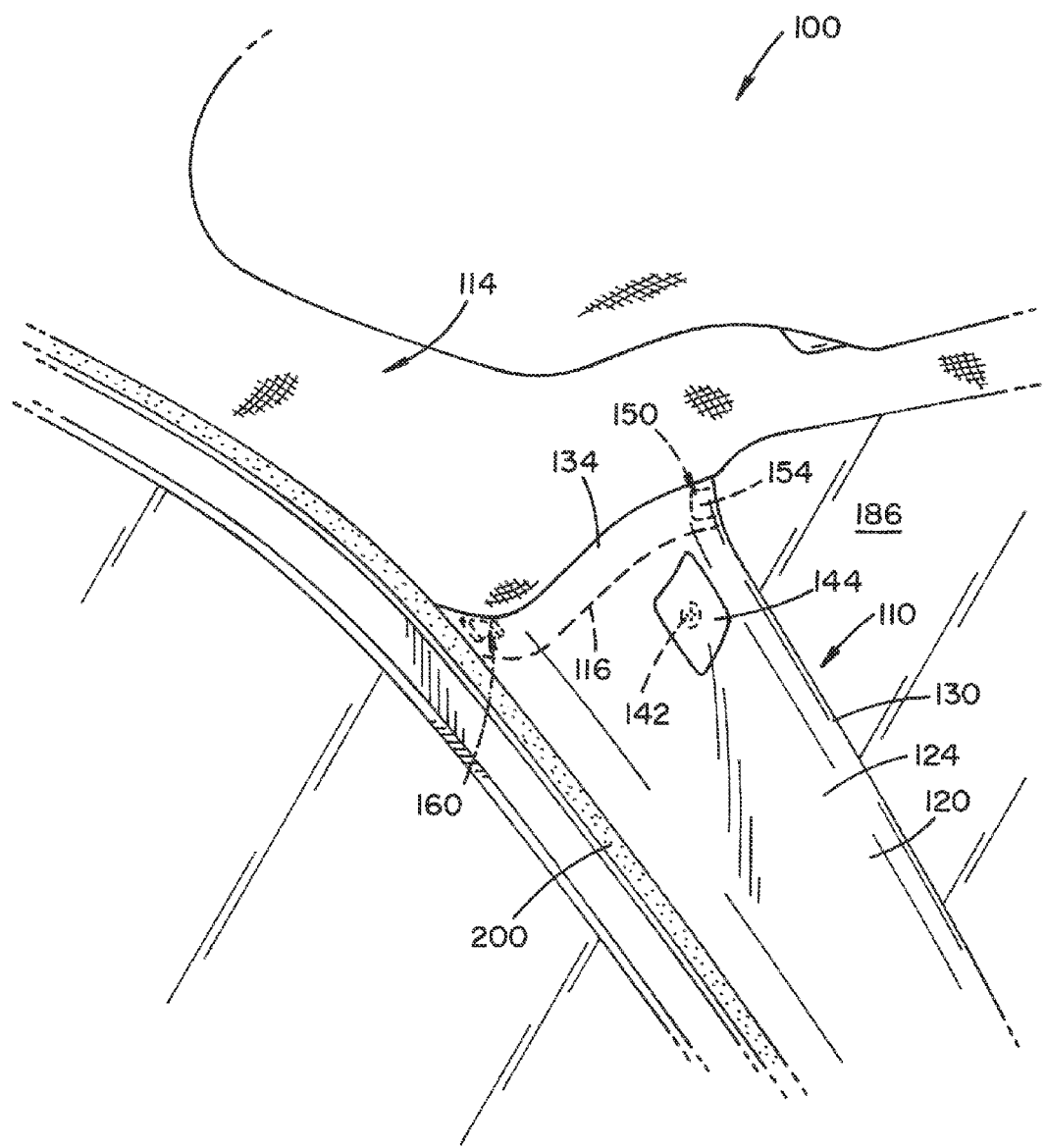
FIG. 1 is a perspective view of an interior portion of a vehicle that has a vehicle body structural member with a vehicle interior garnish releasably secured thereto in accordance with an illustrated embodiment of the present disclosure.

Referring now to the drawings, wherein like numerals refer to like parts throughout the several views, FIG. 1 illustrates an interior portion of a vehicle 100 including a vehicle body 102 that defines a passenger compartment. A pair of vehicle interior trim panels or interior garnishes 110 in accordance with the present disclosure is releasably secured to structural pillars 112 of the vehicle body 102. A headliner 114 at least partially covers an exposed interior surface of the pillars 112. It should be appreciated that the vehicle interior garnish 110 on the driver's side, which is depicted in FIG. 1, is a mirror image of the vehicle interior garnish 110 on the passenger's side. Thus, the following description of the vehicle interior garnish 110 for the driver's side structural pillar 112 also applies to the vehicle interior garnish for the passenger's side structural pillar 112.

The interior garnish 110 is secured to the headliner 114 and is configured to conceal a lower edge portion 116 of the headliner 114 and cover at least a portion of the structural pillar 112. The interior garnish 110 can be made of plastic, composite or any suitable material as is known in the art. An air bag (not shown) can be disposed between the interior garnish 110 and the structural pillar 112. The interior garnish 110 is configured to overlay a portion of the pillar 112 and conceal the airbag. The interior garnish 112 is releasably secured to the headliner 114 and the pillar 112 in a manner so that the interior garnish 110 moves away from the pillar 112 and responds to deployment of the concealed air bag. As shown in FIG. 1, the structural pillar 112 is an A-pillar of the vehicle body 102 and the interior garnish 110 is a front pillar garnish. Of course, the exemplary vehicle interior garnish 110 can be employed in other areas of the vehicle 100.

Further details of the interior garnish 110 are shown in FIGS. 2 and 3. As illustrated, the interior garnish 110 includes a main body 120 having a pillar facing surface 122 and a passenger compartment facing surface 124. The pillar facing surface 122 constitutes a concealed surface in that the pillar facing surface is not visible from within the passenger compartment while the interior garnish 110 is in its installed position. The passenger compartment facing surface 124 constitutes an exposed surface in that the passenger compartment facing surface is visible from within the passenger compartment while the interior garnish 110 is in its installed position. The main body 120 further includes a first longitudinal side portion 130, an opposite second longitudinal side portion 132, an upper end portion 134, and a lower end portion (not shown). A clip or fastener seat 138 having a generally trapezoidal cross-section bulging toward the structural pillar 112 is formed on the pillar facing surface 122 of the interior garnish 110. An opening 140 is formed in the clip seat 138 for receiving a fastener 142 which engages a corresponding threaded opening 146 on the pillar 112 (FIG. 1). A cover 144 can be positioned in the clip seat 138 for covering the fastener 142.

The interior garnish 110 further includes a first engagement member 150 and a second engagement member 152. In the depicted embodiment of FIG. 3, the first engagement member 150 is located adjacent the first side portion 130 and the second engagement member 152 is located adjacent the second side portion 132. As shown, the first and second engagement members 150, 152 are approximately equally spaced from the upper end portion 134 of the interior garnish main body 120; although, this is not required. As will be discussed in greater detail below, the first engagement member 150 is configured to hold the interior garnish 110 in an install position relative to the headliner 114, and the second engagement member 152 is configured to releasably secure the interior garnish 110 to the headliner 114.

With continued reference to FIG. 3, the first engagement member 150 is in the form of a restraining tab 154 projecting outwardly from and substantially normal to the pillar facing surface 122 of the main body 120. According to one aspect, the restraining tab 154 projects outwardly from a peripheral edge 156 of the first side portion 130 of the pillar facing surface 122; though, it should be appreciated that the restraining tab 154 can be spaced inwardly from the peripheral edge 156. The second engagement member 152 has a configuration different than the configuration of the first engagement member 150. Particularly, the second engagement member is in the form of an L-shaped lock tab 160. The lock tab 160 includes a first portion 162 and a second portion 164. The first portion 162 is spaced from a peripheral edge 166 of the second side portion 132 and projects outwardly from and substantially normal to the pillar facing surface 122 of the main body 120. The second portion 164 extends away from the first portion 162 toward the first side portion 130 of the main body 120 and the restraining tab 154. The second portion 164 is spaced a predetermined distance from the pillar facing surface 122 so as to receive and retain a portion of the headliner 114 between the second portion 164 and the pillar facing surface 122. Further, the second engagement member 152 can include a tunable rib 168 for controlling contact of the second engagement member with the headliner 114. Particularly, by changing the location of the rib 168 relative to the first portion 162, the rib allows for increased/decreased contact with the headliner 114 and this contact with the headliner at least partially determines the fit and finish of the assembly.

As shown in FIG. 3, the pillar facing surface 122 of the main body 120 can further include a plurality of strengthening ribs 174 which provide strength and rigidity to the interior garnish 110. Each strengthening rib 174 can extend between the first and second longitudinal side portions 130, 132 of the main body 120. However, to allow for assembly of the interior garnish 110 to the headliner 114, an area 176 of the main body 120 adjacent the upper end portion 134 and between the first and second engagement members 152, 154 is devoid of the strengthening ribs 174. This allows that area 176 of the interior garnish 110 to flex and stretch during securement of the interior garnish 110 to the headliner 114.

Figure 4:
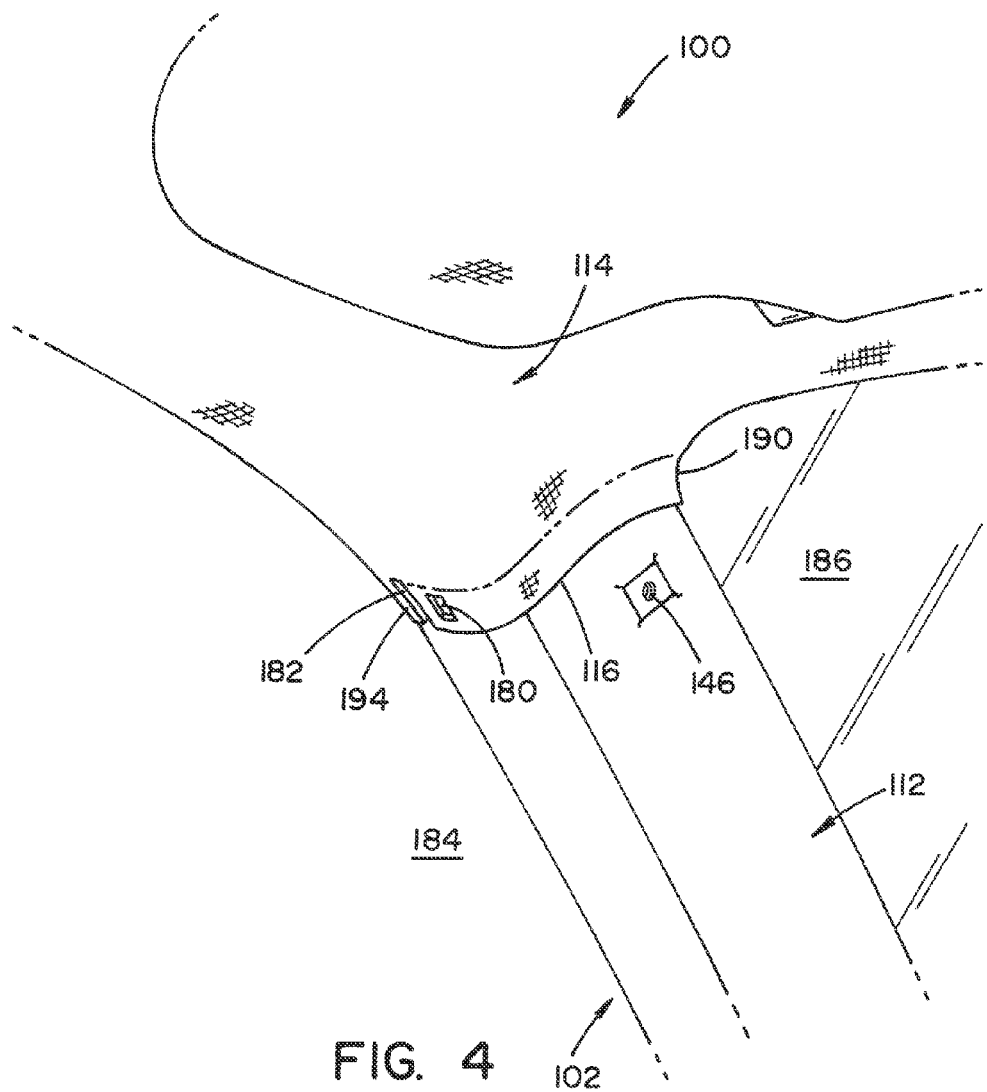
FIG. 4 is a perspective view of the interior portion of the vehicle shown in FIG. 1 with the interior garnish removed.

With reference now to FIG. 4, the headliner 114 is configured to be engaged by the second engagement member or lock tab 160. In the illustrated embodiment, the headliner 114 includes an opening 180 for receiving the second portion 164 of the lock tab 160. The opening 180 is spaced from and located adjacent to the lower edge portion 116 of the headliner 114. The headliner 114 further includes a slot 182 located adjacent the opening 180 and toward a door opening 184. The slot 182 extends inwardly from the lower edge portion 116 and is adapted to receive the upper end portion 134 of the interior garnish main body 120.

Figure 5:
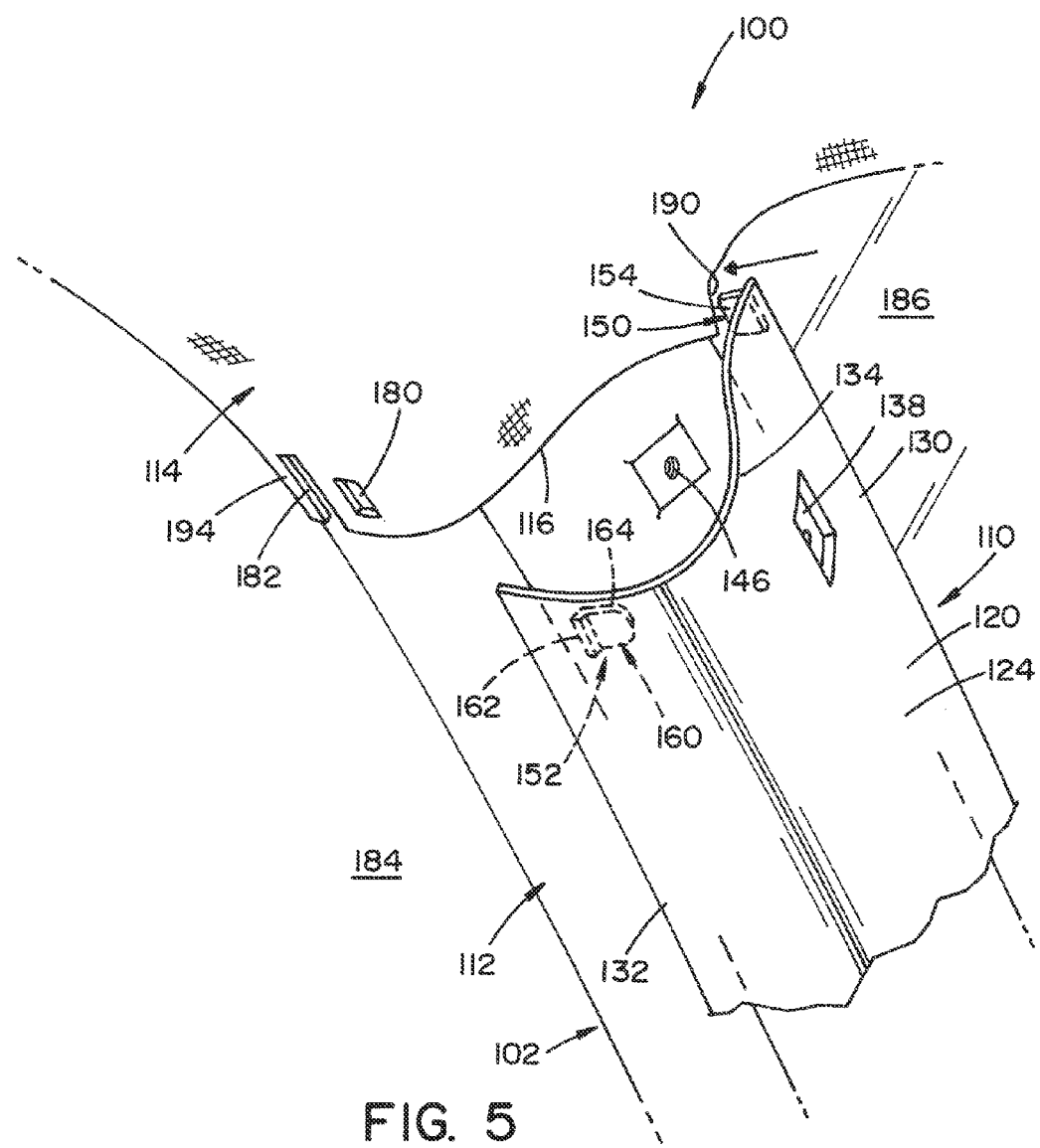
FIGS. 5-7 are perspective views of the interior portion of the vehicle shown in FIG. 1 with the interior garnish being secured to the structural member.
Figure 6:
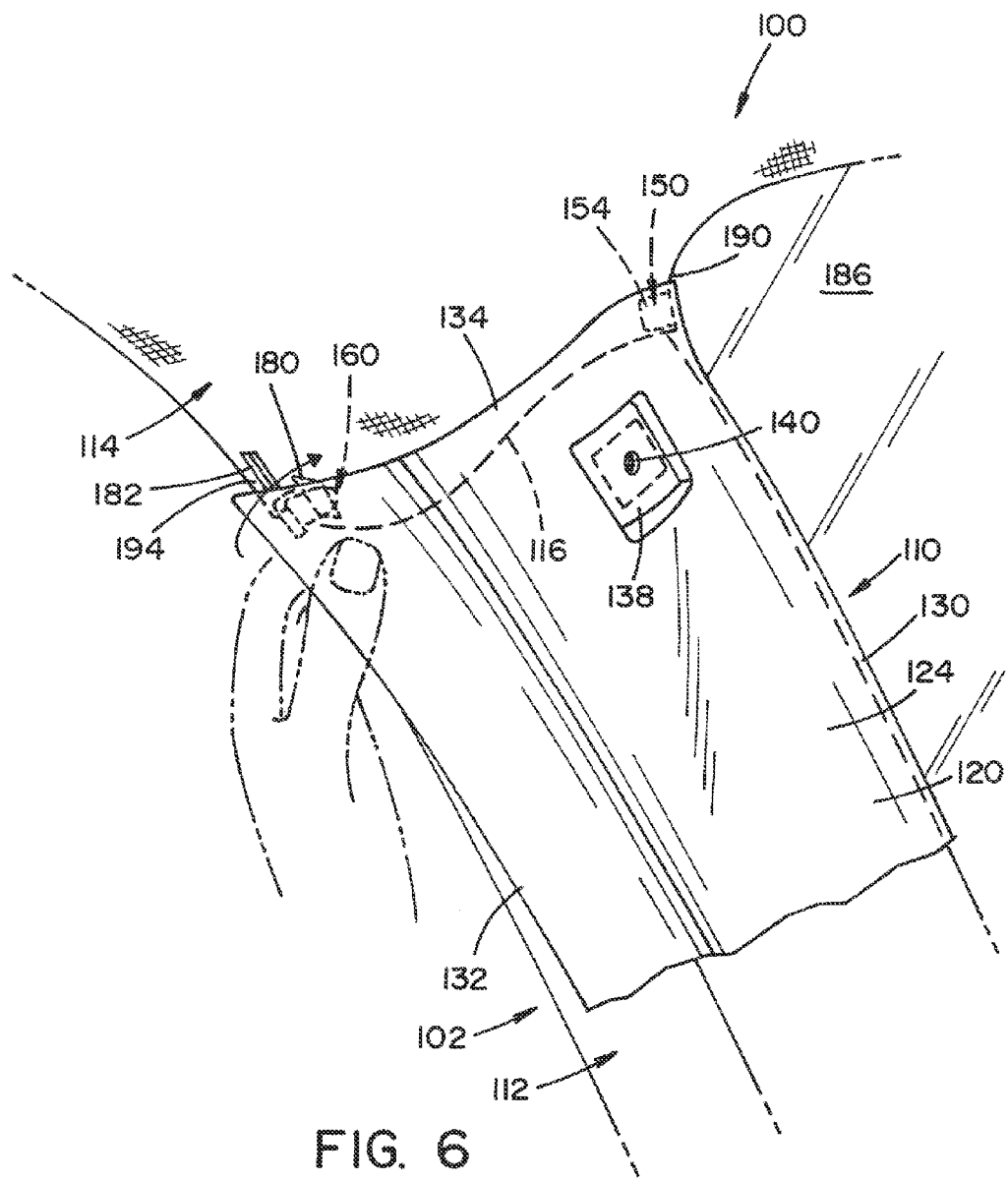
Figure 7:
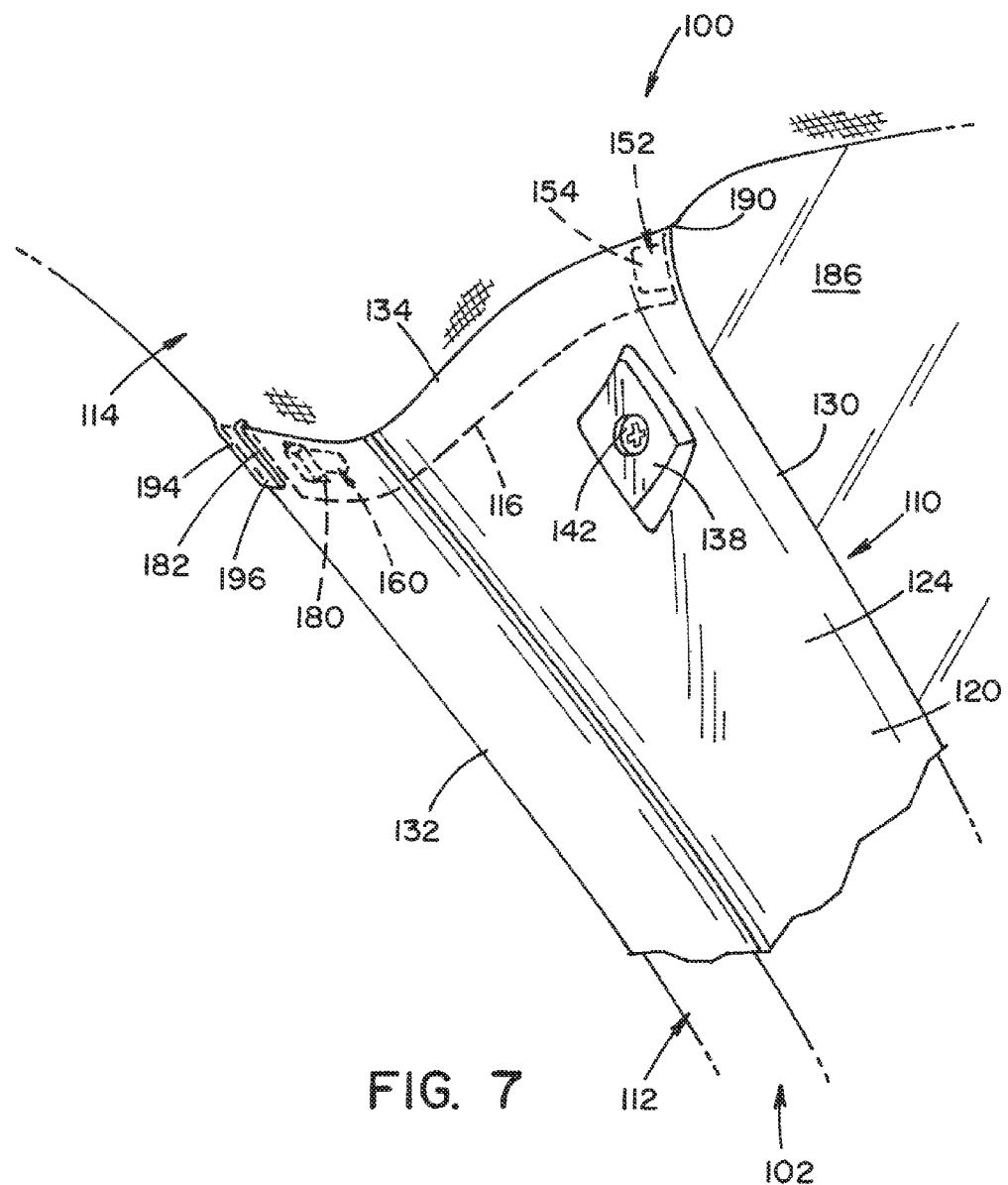

FIGS. 5-7 depict the assembly of the interior garnish 110 to the structural pillar 112 and the headliner 114. The first engagement member or restraining tab 154 is positioned behind an edge portion 190 of the headliner 114 and engages the edge portion 190. This edge portion 190 is forwardly disposed, i.e. near a windshield 186 of the vehicle and at the lower edge portion 116 of the headliner 114. This engagement between the restraining tab 154 and the edge portion 190 of the headliner 114 creates an opposing force to hold the interior garnish 112 in an install position prior to engagement of the lock tab 160 to the headliner 114. The second engagement member or lock tab 160 is positioned in the opening 180 which, again, is spaced inwardly from the lower edge portion 116 of the headliner 114. The lock tab 160 is configured to press the headliner 114 towards the pillar facing surface 122. The restraining tab 154 and lock tab 160 pull the headliner 114 and the interior garnish 110 together, which, in turn, closes any gap between the upper end portion 134 of the interior garnish main body 120 and the headliner 114. Further, as indicated previously, the area 176 of the pillar facing surface 122 is devoid of strengthening ribs 174. This allows the upper end portion 134 of the main body 120 to stretch around the structural pillar 112 so that the lock tab 160 can be positioned in the opening 180 of the headliner 114. After the second portion 164 of the lock tab 160 is positioned in the headliner opening 180, pressure can be applied to the passenger compartment facing surface 124 of the main body 120 to fully seat the second engagement member or lock tab 160 in the headliner opening 180.

Figure 8:
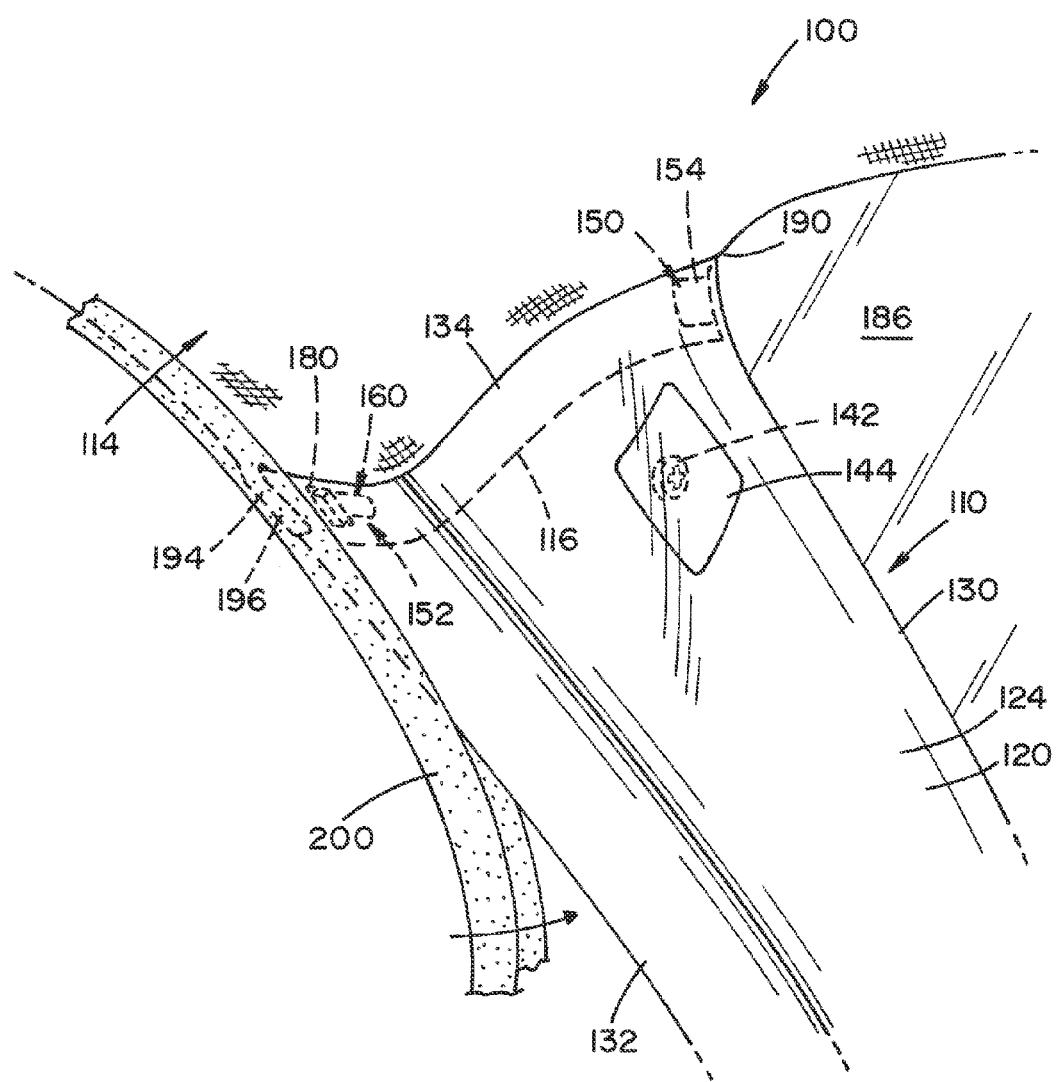
FIG. 8 is a perspective view of the interior portion of the vehicle shown in FIG. 1 showing a door open seal applied to the interior garnish.

With reference to FIG. 7, with the lock tab 160 fully engaged, the upper end portion 134 of the main body 120 is then weaved with a section 194 of the headliner 114 to create a material overlap 196. In other words, the material overlap 196 is created by the weaving of the main body 120 with the headliner 114 so that the section 194 of the headliner is positioned on the passenger compartment facing surface 124. To conceal the material overlap 196, and as depicted in FIG. 8, a door open seal 200 is secured to the structural pillar 112 and headliner 114. The door open seal 120 also covers or conceals the slot 182 provided in the headliner 114 so that the edge slot is hidden from view by the occupant. After installation of the interior garnish 110 and door open seal 200, the intersection between the interior garnish 110 and headliner 114 results in a consistent and continuous touch condition between the parts. The assembly also provides for a good fit and finish along the interior garnish/headliner area which will be maintained by the restraining tab 154 and the engagement of the lock tab 160 with the headliner 114.

As is evident from the foregoing, an exemplary method of assembling a front pillar garnish 110 to an structural pillar 112 of a vehicle body 102 comprises providing a first engagement member 150 and a second engagement member 152 on a pillar facing surface 122 of a main body 120 of the front pillar garnish 110; positioning the first engagement member 150 behind an edge portion 190 of a headliner 114 and engaging the edge portion 190 with the first engagement member, the first engagement member creating an opposing force to hold the front pillar garnish 110 in an install position; positioning the second engagement member 152 in an opening 180 located in the headliner 114; weaving an upper end portion 134 of the main body 120 with a section 194 of the headliner to create a material overlap 196; and concealing the material overlap 196 with a door open seal 200.

The exemplary method further comprises stretching an upper end portion 134 of the main body 120 to position the second engagement member 150 in the headliner opening 180; applying pressure to a passenger compartment facing surface 124 of the main body 120 to fully seat the second engagement member 152 in the headliner opening 180; and providing a slot 182 on the headliner 114 for receiving the upper end portion 134 of the main body 120 and concealing the slot 182 with the door open seal 200.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
a vehicle body including a structural pillar;
a headliner at least partially covering an exposed interior surface of the pillar; and
an interior garnish secured to the headliner and configured to conceal a lower edge portion of the headliner and cover at least a portion of the pillar, the interior garnish includes a main body having a pillar facing surface, a passenger compartment facing surface, a first longitudinal side portion, an opposite second longitudinal side portion, and an upper end portion, the interior garnish further includes a first engagement member located adjacent the first side portion and a second engagement member located adjacent the second side portion, the first engagement member is configured to hold the interior garnish in an install position relative to the headliner, and the second engagement member is configured to secure the interior garnish to the headliner, wherein the headliner includes an opening receiving the second engagement member.

2. The vehicle assembly of claim 1, wherein the second engagement member has a configuration different than a configuration of the first engagement member.

3. The vehicle assembly of claim 2, wherein the first engagement member is a restraining tab projecting outwardly from and substantially normal to the pillar facing surface of the main body.

4. The vehicle assembly of claim 3, wherein the second engagement member is a L-shaped lock tab including a first portion projecting outwardly from and substantially normal to the pillar facing surface of the main body and a second portion extending away from the first portion toward the first side portion of the main body.

5. The vehicle assembly of claim 4, wherein the second engagement member includes a tunable rib for controlling contact of the second engagement member with the headliner.

6. The vehicle assembly of claim 1, wherein the headliner includes a slot located adjacent the opening receiving the upper end portion of the interior garnish main body.

7. The vehicle assembly of claim 6, wherein a section of the headliner at least partially defined by the slot extends over the passenger compartment facing surface of the interior garnish main body.

8. The vehicle assembly of claim 7, further including a door open seal concealing the slot and the section of the headliner extending over the passenger compartment facing surface.

9. The vehicle assembly of claim 1, wherein the pillar facing surface includes a plurality of strengthening ribs extending between the first and second side portions of the interior garnish main body, wherein an area of the main body adjacent the upper end portion and between the first and second engagement members is devoid of strengthening ribs.

10. A vehicle assembly comprising:
a vehicle body including an A-pillar;
a headliner at least partially covering an interior surface of the A-pillar; and
a front pillar garnish secured to the headliner and concealing a lower edge portion of the headliner and covering at least a portion of the A-pillar, the front pillar garnish includes a main body including a pillar facing surface having a lock tab and a restraining tab, the lock tab engages the headliner and is pressing the headliner towards the pillar facing surface of the front pillar garnish main body, the restraining tab creates an opposing force to hold the front pillar garnish in an install position, the lock tab and the restraining tab pulling the headliner and front pillar garnish together.

11. The vehicle assembly of claim 10, wherein the lock tab includes a tunable rib for controlling contact of the lock tab with the headliner.

12. The vehicle assembly of claim 10, wherein the restraining tab projects outwardly from an edge of the pillar facing surface and the lock tab projects toward the restraining tab.

13. The vehicle assembly of claim 10, wherein the headliner includes an opening spaced inwardly from the lower edge portion for receiving the lock tab.

14. The vehicle assembly of claim 13, wherein the headliner includes a slot extending inwardly from the lower edge portion receiving an upper end portion of the front pillar garnish body, the upper end portion is weaved between the slot and the headliner to create a material overlap.

15. The vehicle assembly of claim 14, further including a door open seal covering the material overlap and the slot.

16. A method of assembling a front pillar garnish to an A-pillar of a vehicle body, the method comprising:
providing a first engagement member and a second engagement member on a pillar facing surface of a main body of the front pillar garnish;
positioning the first engagement member behind an edge portion of a headliner and engaging the edge portion with the first engagement member, the first engagement member creating an opposing force to hold the front pillar garnish in an install position;
positioning the second engagement member in an opening located in the headliner;
weaving an upper end portion of the main body with a section of the headliner to create a material overlap; and
concealing the material overlap with a door open seal.

17. The method of claim 16, comprising stretching an upper end portion of the main body to position the second engagement member in the headliner opening.

18. The method of claim 17, comprising applying pressure to a passenger compartment facing surface of the main body to fully seat the second engagement member in the headliner opening.

19. The method of claim 16, comprising providing a slot on the headliner for receiving the upper end portion of the main body and concealing the slot with the door open seal.

\* \* \* \* \*